(12) United States Patent
Pun et al.

(10) Patent No.: US 7,826,133 B2
(45) Date of Patent: Nov. 2, 2010

(54) DOPED POLYMERIC OPTICAL WAVEGUIDE AMPLIFIERS

(75) Inventors: Edwin Yue Bun Pun, Hong Kong (CN); Wing Han Wong, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 0 days.

(21) Appl. No.: 11/033,438

(22) Filed: Jan. 11, 2005

(65) Prior Publication Data

US 2006/0152797 A1    Jul. 13, 2006

(51) Int. Cl.
*H01S 4/00*     (2006.01)
*C03B 37/075*   (2006.01)

(52) U.S. Cl. .......................... 359/333; 65/390
(58) Field of Classification Search ................... 65/390; 359/333
See application file for complete search history.

(56) References Cited

U.S. PATENT DOCUMENTS

| | | | |
|---|---|---|---|
| 4,037,172 A * | 7/1977 | Filipescu et al. | 372/40 |
| 5,136,682 A * | 8/1992 | Moyer et al. | 385/141 |
| 5,526,454 A * | 6/1996 | Mayer | 385/49 |
| 6,292,292 B1 * | 9/2001 | Garito et al. | 359/341.5 |
| 6,533,907 B2 * | 3/2003 | Demaray et al. | 204/192.25 |
| 6,538,805 B1 * | 3/2003 | Norwood et al. | 359/341.5 |
| 2002/0009274 A1 * | 1/2002 | Gharavi | 385/122 |
| 2003/0035632 A1 * | 2/2003 | Glebov et al. | 385/43 |
| 2003/0052081 A1 * | 3/2003 | Koops | 216/24 |
| 2003/0123830 A1 * | 7/2003 | Yeniay | 385/131 |
| 2003/0128956 A1 * | 7/2003 | Sharma et al. | 385/145 |
| 2003/0138657 A1 * | 7/2003 | Li et al. | 428/621 |
| 2004/0067450 A1 * | 4/2004 | Leatherdale et al. | 430/322 |
| 2004/0201000 A1 * | 10/2004 | Norwood et al. | 252/582 |
| 2005/0011873 A1 * | 1/2005 | Withford et al. | 219/121.69 |
| 2005/0088723 A1 * | 4/2005 | Kawazoe et al. | 359/333 |
| 2005/0195472 A1 * | 9/2005 | Tang | 359/333 |
| 2005/0288483 A1 * | 12/2005 | Ding et al. | 528/401 |
| 2006/0105492 A1 * | 5/2006 | Veres et al. | 438/99 |

FOREIGN PATENT DOCUMENTS

GB    2278716 A    * 12/1994

OTHER PUBLICATIONS

Slooff et al. Rare-Earth Doped Polymers for Planar Optical Amplifiers. Journal of Applied Physics. vol. 91, No. 7. Apr. 1, 2002. pp. 3955-3980.*

Ulieru et al. Laser patterning—innovative technology for mass production of microstructures. Semiconductor Conference, 2005. CAS 2005 Proceedings. Oct. 3-5, 2005. pp. 245-248. vol. 1.*

(Continued)

*Primary Examiner*—Eric Bolda
(74) *Attorney, Agent, or Firm*—Heslin Rothenberg Farley & Mesiti P.C.

(57) ABSTRACT

A polymer-based optical waveguide amplifier comprises a polymer host material doped with rare earth ions wherein the polymer host material is a material that functions as a resist in a direct patterning technique. The polymer host material can be epoxy novalac resin doped with $Er^{3+}$ ions and $Yb^{3+}$ ions, and the direct patterning comprises electron beam direct writing or UV printing.

10 Claims, 3 Drawing Sheets

Er-Yb codoped waveguide

OTHER PUBLICATIONS

DeCorby et al. High Index Contrast Waveguides in Calcogenide Glass and Polymer. IEEE Journal of Selected Topics in Quantum Electronics. vol. 11. No. 2. Mar./Apr. 2005.*

Kim et al. Electrooptic Polymer Modulators with an Inverted-Rib Waveguide Structure. IEEE Photonics Technology Letters, vol. 15, No. 2, Feb. 2003.*

Ma et al. Polymer-Based Optical Waveguides: Materials, Processing, and Devices. Advanced Materials. 2002, 14, No. 19, Oct. 2, 2002.*

Liao et al. Dynamics of Distributed Feedback fiber lasers. CLEO 1996. pp. 392-393.*

Chen et al. Single Mode Nd3+ Doped Graded Index Polymer Waveguide Amplifier. IEEE Photonics Technology Letters. vol. 5. No. 11. Nov. 1993.*

Oh et al. Plastic Optical Amplifier using Europium Complex. Proceedings of SPIE. vol. 4282 (2001).*

Wong et al., "Er-Yb codoped polymeric optical waveguide amplifiers", Applied Physics Letters, vol. 84, No. 2, pp. 176-178 (Jan. 12, 2004).*

* cited by examiner

Er-Yb codoped waveguide

DOPED POLYMERIC OPTICAL WAVEGUIDE AMPLIFIERS

FIELD OF THE INVENTION

This invention relates to rare-earth doped optical active devices, such as waveguide amplifiers in particular, formed of polymeric materials, and to methods of fabricating such amplifiers.

BACKGROUND OF THE INVENTION

Optical fiber systems operating at the 1500 nm wavelength region have received much attention in recent years. Planar optical waveguide devices and circuits are essential for these fiber communication systems, especially in metropolitan area networks and local area networks. A wide range of optical waveguide devices, such as splitters, couplers, switches and modulators are required and many designs are known for such devices.

However, the overall system performance can be degraded as a consequence of losses. Losses may occur in particular either within individual devices or at the junctions and interconnections between devices. Such losses may result from waveguide imperfections, coupling losses, propagation losses, and losses due to mismatch between waveguide and fiber modes. In order to compensate for such losses optical systems may be provided with optical amplifiers and such optical amplifiers are of major importance and play a significant role in optical communications systems.

A known technique for providing optical amplification in an optical waveguide is to dope the waveguide core with rare earth ions. Erbium ($Er^{3+}$) ions are known to be particularly useful in this context because the $^4I_{13/2}$–$^4I_{15/2}$ transition near 1540 nm wavelength matches one of the fiber low-loss windows. For this reason erbium-doped fiber amplifiers have already been implemented in optical fiber systems, and erbium-doped waveguide amplifiers have been fabricated using glass and crystal host materials.

Polymeric materials have many advantages for use in optical waveguide devices. These advantages include low costs, high packaging density and simple processing steps. Existing techniques for fabricating such devices include reactive ion beam etching, photobleaching, ion-implantation processes, and conventional lithography followed by etching. However, these known methods have the disadvantage that they involve many processing steps and can lead to a long fabrication time and low yield.

A further problem with existing optical amplifiers based on polymeric materials is that compared with inorganic host materials such as glass and crystal it is comparatively difficult to dissolve rare earth ions in polymeric materials, because most of the rare earth ions are in inorganic salt forms that do not mix well with polymers and coagulation occurs. Polymer-based optical amplifiers have been doped with $Nd^{3+}$ as for example in R. T Chen, M. Lee, S. Natarajan, C. Lin, Z. Z. Ho and D. Robinson, "*Single-Mode Nd3+-doped graded-index polymer waveguide amplifier*", IEEE Photon. Technol. Lett. Vol. 5, p. 1328-1331 (1993) which described $NdCl_3$-doped photolime-gelatin, and G. Karve, B. Bihari and R. T. Chen, "*Demonstration of optical gain at 1.06 μm in a neodymium-doped polyimide waveguide*", Appl. Phys. Lett. Vol. 77, p. 1253-1255 (2000) describing neodymium-doped polyimide. The doping of polymers with other rare-earth ions such as erbium has, however, been much harder to achieve.

SUMMARY OF THE INVENTION

According to the present invention there is provided a polymer-based optical waveguide amplifier comprising a polymer host material doped with rare earth ions wherein said polymer host material is a material that functions as a resist in a direct patterning technique.

Preferably the polymer host material is epoxy novalak resin.

Preferably the polymer host material is doped with $Er^{3+}$ ions, more preferably still the polymer material is co-doped with $Er^{3+}$ ions and $Yb^{3+}$ ions. The ratio of $Er^{3+}$ ions to $Yb^{3+}$ ions may be from 1.33:1 to 1:10.

According to another aspect of the invention there is also provided a method of fabricating a waveguide optical amplifier comprising the steps of:

(a) forming a polymeric material doped with rare earth ions;

(b) depositing the doped polymeric material on a substrate; and (c) forming a waveguide pattern by a direct patterning technique.

Preferably the polymeric material comprises epoxy novalak resin.

Preferably the direct patterning technique comprises electron beam direct writing, alternatively the direct patterning technique comprises UV light patterning.

In preferred embodiments of this method the rare earth ions comprise $Er^{3+}$ ions, or a mixture of $Er^{3+}$ and $Yb^{3+}$ ions.

Preferably step (a) comprises mixing together the polymeric material and a source of said rare earth ions, and heating the mixture until it melts. In such an embodiment the source of the rare earth ions comprises a pentanedione derivative.

According to a further aspect of the present invention there is provided a polymer-based optically active device comprising a polymer host material doped with rare earth ions wherein the polymer host material is a material that functions as a resist in a direct patterning technique.

According to a further aspect of the present invention there is provided a polymer-based optical waveguide amplifier comprising epoxy novalac resin material co-doped with $Er^{3+}$ and $Yb^{3+}$ ions.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
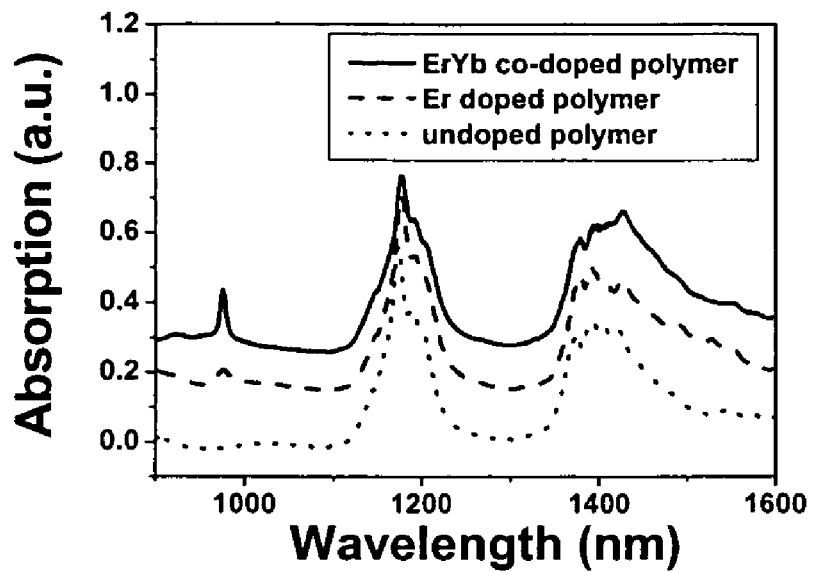
FIG. 1 is a plot showing the absorption spectra for doped polymeric materials fabricated in accordance with embodiments of the invention compared with an undoped polymeric material by way of reference.

Rare earth doped polymeric materials for use in embodiments of the invention may be fabricated using any polymer that is either electron beam sensitive or UV sensitive such that it can be used as a "resist" in a direct patterning technique such as electron beam direct writing or UV direct writing. In this application direct patterning includes either direct writing by electron beam or direct printing by UV light. In addition other direct patterning techniques such as deep UV, visible light techniques and infra-red techniques may also be used. In the case of direct writing by electron beam or UV exposure, the electron irradiation/UV exposure of the polymeric resist film produces micro-structural changes, such as chain scission or cross-linking (depending on the nature of the resist, positive or negative). In the case of negative resist (as in the preferred embodiments to be described below), the exposed polymer will be cross-linked, and during the development stage the unexposed region (not cross-linked) will be dissolved away by the developer, and the exposed resist remains on the substrate will become the ridge waveguide.

An example of a suitable polymer material is Epoxy Novolac Resin (ENR) polymer (formally named as NANO SU8 2000) available from MicroChem Corp.

Epoxy resin has the following formula:

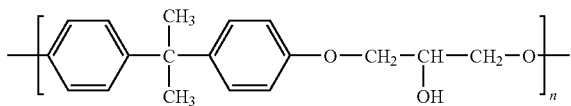

An epoxy group has the formulation of $CH_2$—O—CH—R while the novolac is a two-step resins. This is prepared by an acid catalyzed reaction with less than one molecule of formaldehyde per molecule of phenol. A curing agent is used to complete the cure and normally this is added during the grinding operation so that the powdered resin purchased from the resin manufacturer is ready to use. The curing agent is usually hexamethylenetetramine (hexa). Novolacs can be powdered or in liquid form.

ENR polymer (epoxy novolak resin or sometimes called epoxy novalak resin by Microchem Corp.) is a key ingredient in the formulation of SU8. SU8 has a structure:

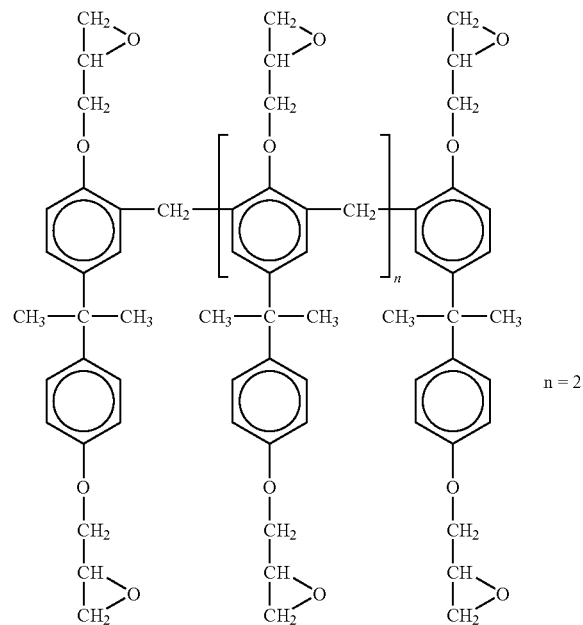

This polymer is particularly suitable for use in embodiments of the present invention because it is capable of acting as a negative tone electron beam sensitive resist with a sensitivity of over 100 times faster than, for example, (poly) methylmethacrylate polymer. In order to fabricate polymeric optical waveguide amplifiers in accordance with embodiments of the invention the ENR polymer was doped by adding either $Er^{3+}$ ions alone, or co-doped by adding $Er^{3+}$ ions and $Yb^{3+}$ ions in various ratios ($Er^{3+}$:$Yb^{3+}$) including 2.2:3.6, 2.2:4.7, 4:3, 1.2:4.8 and 1:10 (eg the ratio may be somewhere between 1.33:1 and 1:10) the results of which will be described below.

This doping was achieved by adding $Er^{3+}$ and $Yb^{3+}$ organic pentanedione derivatives and heating the mixture until it has melted thoroughly. Normally the derivatives are heated to their melting point and maintained at this temperature for a few hours before cooling. Pentadione derivatives are used by preference since the chemical structure of pentadione derivative is similar to that of ENR polymer, and both of them (pentadione derivatives and ENR) are in solution form, and therefore the incorporation of the derivative into the host is easier and coagulation can be avoided. Other possible organic or inorganic sources of the rare earth ions may be used, however, provided that the incorporation of the rare earth ions does not generate coagulation. The appearance of the coagulation will increase losses in the resultant film and dramatically reduce the overall performance of the amplifiers obtained.

One example of an Er—Yb codoping process is as follows: 27.5 mg of Er derivatives (Erbium (III) acetylacetonate hydrate, $Er(CH_3COCHCOCH_3)_3 \cdot xH_2O$) and 45 mg of Yb derivatives ($Yb(CH_3COCHCOCH_3)_3 \cdot xH_2O$) are mixed with 2 cc of ENR polymer (SU8) and heated to the derivatives' melting point (125° C.). The mixture is maintained at this temperature for around 1-2 hours. The resultant ENR doped polymer will be around 1 cc in volume, corresponding to $0.35 \times 10^{20}$ ion/cc for Er and $0.55 \times 10^{20}$ ion/cc for Yb.

After doping/co-doping the polymeric material the optical waveguide amplifiers were formed by depositing the doped/co-doped polymeric material on thermally oxidized silicon wafers as substrates. The wafers were formed with an approximately 2.5 µm thick oxide layer which also acts as the lower cladding layer. The doped/co-doped polymeric material was spun on top of the wafers to form the waveguide layer and a prebake time of 5 minutes at 90° C. was applied to all devices.

The resulting devices, and in particular the co-doped polymeric film, were characterized optically using a Metricon 2010 prism couple system. At a wavelength of 1550 nm the refractive index of the Er—Yb co-doped polymer is about 1.573 which is slightly smaller than that of the undoped polymer (1.575). No skinning effect or particle precipitation appears, and a uniform layer was obtained after spinning.

After forming the layer of doped or co-doped polymer material on the silicon wafer substrate, an optical waveguide pattern may be formed by direct patterning such as by electron beam direct writing techniques. Direct patterning is particularly advantageous since the optical amplifiers can be formed by either electron beam direct writing or UV light patterning and are obtained after development without any further processing steps and the whole fabrication process is therefore far simpler than that described, for example, in U.S. Pat. No. 6,292,292.

In particular a nanowriting system such as the Leica EBL-100L nanowriter may be used to expose the desired waveguide patterns. All exposures may be performed at 50 keV using 40 pA specimen current with a beam diameter of around 60-80 nm. To achieve optimum field stitching effect, 102.4 µm was chosen as the field size. After exposure of the waveguide pattern, the sample was developed using a developing agent such as propylenglygol-monomethylether-acetate (PGMEA) for 20 s and then rinsed in fresh PGMEA. As an alternative to electron beam writing, however, direct patterning by direct printing with UV exposure may also be possible.

FIG. 1 shows the absorption spectra in solution form of respectively $Er^{3+}$—$Yb^{3+}$ doped ENR polymer formed by the example given above, $Er^{3+}$ doped ENR polymer, and undoped ENR polymer measured using a Perkin Elmer Instruments UV-visible-near-IR λ19 spectrophotometer. For the $Er^{3+}$—$Yb^{3+}$ doped ENR polymer the density of the dopants was estimated to be about $0.33 \times 10^{20}$ ion/cm$^3$ for the $Er^{3+}$ ions, and about $0.54 \times 10^{20}$ ion/cm$^3$ for the $Yb^{3+}$ ions. For the $Er^{3+}$ doped ENR polymer the dopant ion density was estimated to be about $0.9 \times 10^{20}$ ion/cm$^3$. It should be noted that while the $Er^{3+}$ doped ENR polymer provides a higher absorption peak (at 980 nm) than the undoped polymer, the absorption peak for the co-doped $Er^{3+}$—$Yb^{3+}$ doped ENR polymer is higher still in spite of a lower concentration of $Er^{3+}$ ions. This indicates that while there is some merit in doping with $Er^{3+}$ alone, co-doping with $Er^{3+}$—$Yb^{3+}$ provides a very efficient and advantageous arrangement owing to an efficient transfer of adsorbed energy from the $Yb^{3+}$ ions to the $Er^{3+}$ ions.

If the amplifiers are to be used at the 1.55 µm telecommunication wavelength, Er is used because it has a fluorescence spectrum around the 1.55 µm wavelength range. To improve the efficiency, Ytterbium ($Yb^{3+}$) ions are particularly preferred as co-dopants with $Er^{3+}$ ions because they enhance the effective pump-absorption cross section of $Er^{3+}$ ions and improve the overall efficiency. The Yb ions absorb efficiently the 0.98 µm pump wavelength and transfer the energy to the Er ions. If the signal is to be amplified at other wavelengths, such as 1.33 µm, the usage of Nd or Pr will be more appropriate because Nd and Pr have the fluorescence spectra at this wavelength range. The fluorescence wavelength strongly depends on the rare earth ions used, and each rare earth ions have their own characteristics.

Figure 2:
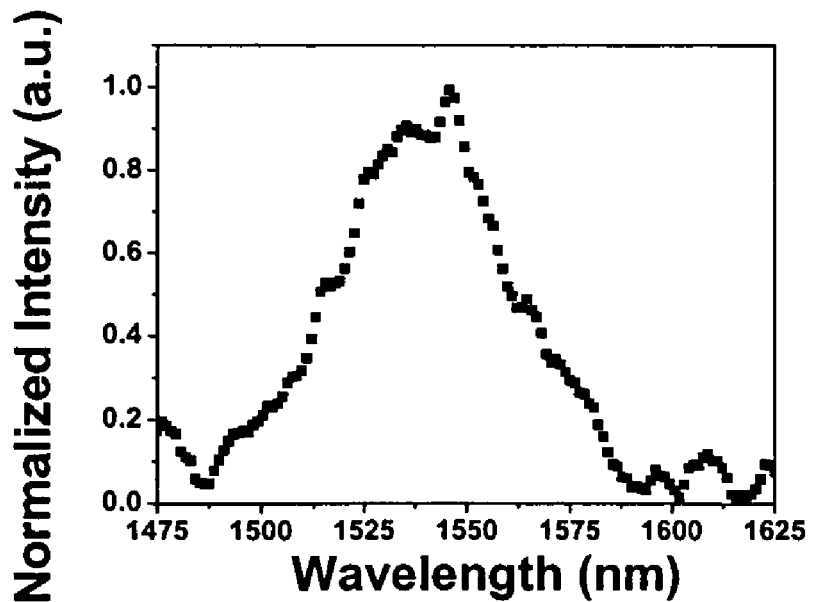
FIG. 2 is a plot showing the photo-luminescence spectrum of a co-doped polymeric material fabricated in accordance with an embodiment of the invention.

FIG. 2 shows the normalized photoluminescence (PL) spectrum of the $Er^{3+}$—$Yb^{3+}$ doped ENR polymer. An argon laser operating at about 514 nm was used as the excitation source and a fluorescence peak at around 1540 nm due to the $^4I_{13/2}$-$^4I_{15/2}$ transition can be observed. The PL spectrum is similar to those of $Er^{3+}$ doped glasses. The full-width at half-maximum (FWHM) is measured to be about 47 nm which is a larger value than for silica-based glasses (where the FWHM is about 30 to 40 nm) and smaller than those of $Er^{3+}$ doped organic polydentate complexes (FWHM about 70 nm). The broad spectrum suggests that the $Er^{3+}$—$Yb^{3+}$ doped ENR polymer would provide a wide gain bandwidth suitable for use with dense wavelength division multiplexing systems.

Figure 3:
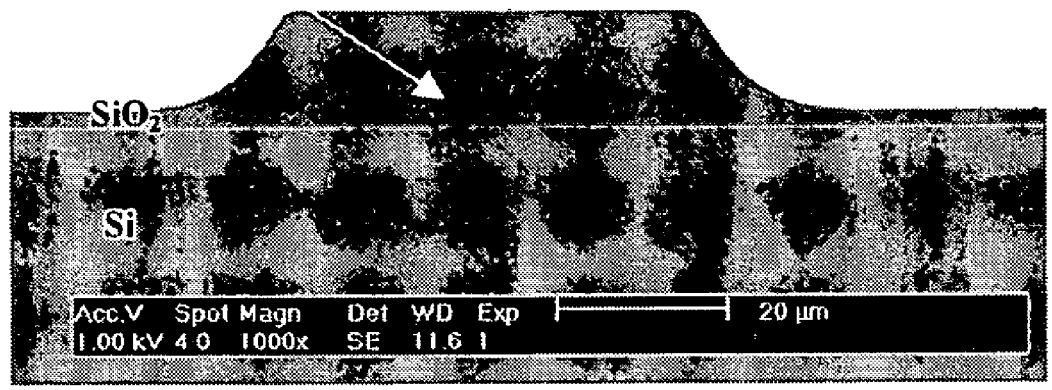
FIG. 3 is a scanning electron microscopy image of a co-doped polymeric optical waveguide amplifier formed in accordance with an embodiment of the invention.

FIG. 3 shows a tilted scanning electron microscope image of a 50 µm×10 µm $Er^{3+}$—$Yb^{3+}$ doped ENR polymer based waveguide amplifier according to an embodiment of the present invention fabricated by an electron-beam direct writing technique as described above. The waveguide has a sharp profile, with very smooth surfaces and sidewalls compared to waveguides fabricated using prior art techniques.

The gain measurement of $Er^{3+}$—$Yb^{3+}$ doped ENR polymer optical amplifiers in accordance with embodiments of this invention was carried out using a 980 nm laser diode as the pump source, and a HP 8168A tunable laser system as the signal source. The signal wavelength used was 1533 nm. Both the signal and pump lights were coupled to the amplifier using a 980/1550 nm wavelength-division multiplexing fiber coupler, and the powers were monitored at one of the coupler output fibers. Output light from the amplifier was collected and coupled to a HP8210A optical spectrum analyzer (OSA). The optical gain is determined from the ratio of the output signal observed on the OSA when both the pump and signal are coupled to the waveguide ($P_{p+s}$) to the signal power without the pump light ($P_s$), ie optical gain=10 log($P_{p+s}/P_s$).

Figure 4:
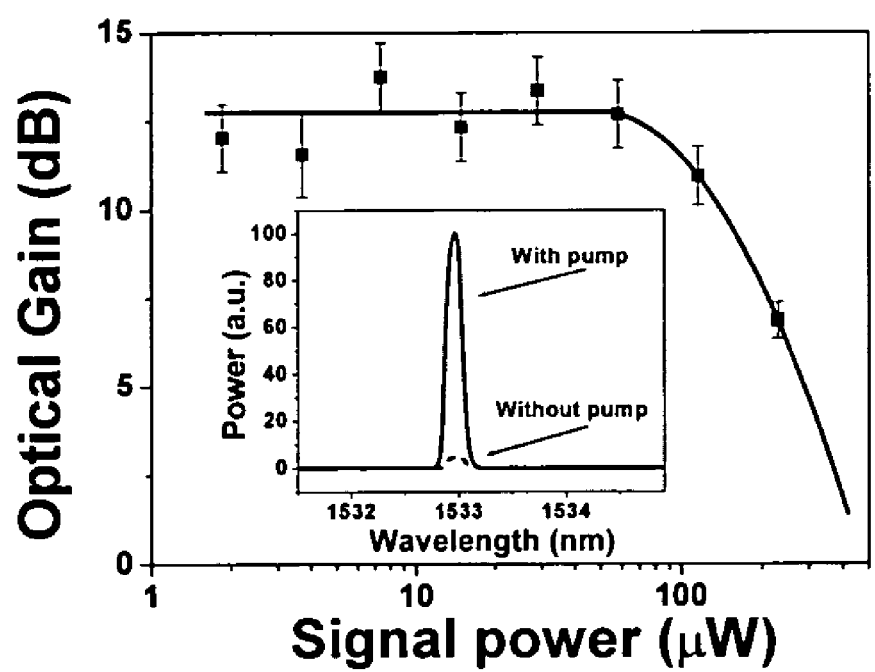
FIG. 4 is a plot illustrating the performance of an optical amplifier formed in accordance with an embodiment of the present invention in terms of optical gain as a function of signal power.

The gain saturation characteristic of an optical waveguide amplifier in accordance with an embodiment of this invention can also be considered. FIG. 4 shows the measured optical gain as a function of signal power in an amplifier 18 mm long. The pump power from the laser diode was kept constant at about 110 mW. It can be seen that the gain increases with decreasing signal power and saturates at about 13 dB when the signal power is smaller than about −18 dBm. Larger gain can be achieved by using a higher pumping power and optimizing the waveguide and doping parameters.

Figure 5:
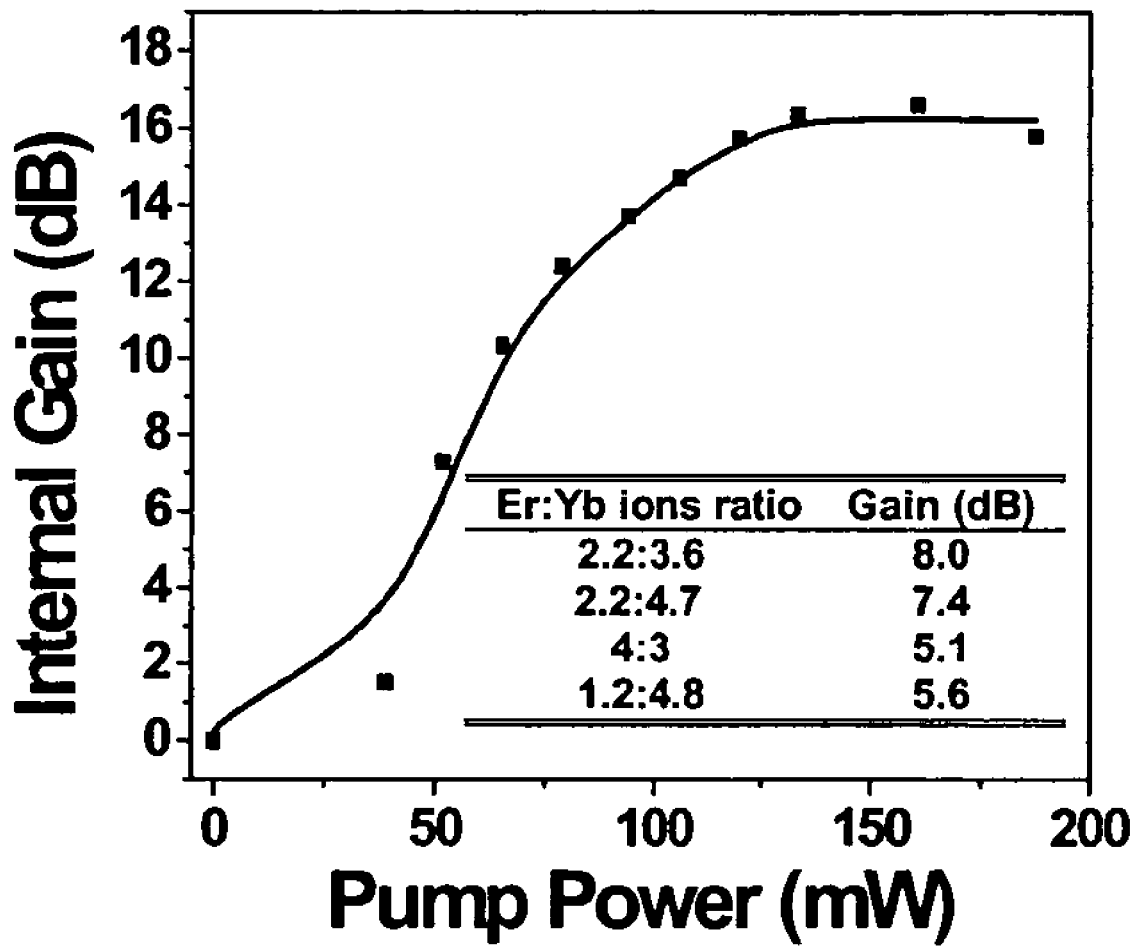
FIG. 5 is a further plot similar to FIG. 4 but showing the results for an amplifier with a different ratio of co-dopants.

FIG. 5 plots the internal gain as a function of pump power in an amplifier 20 mm long and with an $Er^{3+}$—$Yb^{3+}$ ratio of 1:10 and it can be seen that the optical gain approaches 16.5 dB. In the inset table in FIG. 5 the maximum gains for different $Er^{3+}$—$Yb^{3+}$ ratios are shown.

It will thus be seen that a major advantage of the present invention, at least in preferred forms, is the use of an ultraviolet (UV) light/electron beam sensitive host polymer material, leading to a simple fabrication process. Optical active devices, such as amplifiers/lasers, can be formed by UV light or electron beam direct patterning, and are obtained after the development step without any further processing steps. The whole fabrication process is much simplified in comparison with the prior art.

The invention claimed is:

1. A method of fabricating a waveguide optical amplifier comprising the steps of: forming a molten mixture of a radiation-sensitive polymeric host material that comprises a resist for direct patterning and a source of organic rare earth ions, thereby forming at least one of an electron beam sensitive molten polymeric host material doped with organic rare earth ions and a UV light sensitive molten polymeric host material doped with organic rare earth ions, depositing said doped molten polymeric host material on a substrate, thereby forming a polymer-coated substrate, and direct patterning of said polymer-coated substrate, thereby forming a waveguide pattern.

2. A method as claimed in claim 1 wherein said radiation-sensitive host polymeric material comprises epoxy novalak resin.

3. A method as claimed in claim 1 wherein said direct patterning technique comprises electron beam direct writing.

4. A method as claimed in claim 1 wherein said direct patterning comprises UV light patterning.

5. A method as claimed in claim 1 wherein said organic rare earth ions comprise $Er^{3+}$ ions.

6. A method as claimed in claim 1 wherein said organic rare earth ions comprise a mixture of $Er^{3+}$ and $Yb^{3+}$ ions.

7. A method as claimed in claim 1 wherein the step of forming said molten mixture comprises mixing together said radiation-sensitive polymeric material and said source of said organic rare earth ions, and heating the resulting mixture until it melts.

8. A method as claimed in claim 7 wherein said source of said organic rare earth ions comprises a pentanedione derivative.

9. A method as claimed in claim 2 wherein said epoxy novalak resin comprises a negative resist for direct patterning.

10. A method as claimed in claim 6 wherein the ratio of $Er^{3+}$ ions to $Yb^{3+}$ ions is from 1.33:1 to 1:10.

* * * * *